United States Patent [19]

Dembowski et al.

[11] 4,383,854

[45] May 17, 1983

[54] METHOD OF CREATING A CONTROLLED INTERIOR SURFACE CONFIGURATION OF PASSAGES WITHIN A SUBSTRATE

[75] Inventors: Peter V. Dembowski, Richmond Heights, Ohio; Peter W. Schilke, Scotia, N.Y.

[73] Assignee: General Electric Company, Schenectady, N.Y.

[21] Appl. No.: 220,277

[22] Filed: Dec. 29, 1980

[51] Int. Cl.³ .......................... B22F 5/00; B22F 3/00
[52] U.S. Cl. ........................................ 419/1; 419/8; 419/53; 419/49
[58] Field of Search ............... 75/214, 221, 226, 200; 29/420, 421 R, 156.8 H, 156.8 T; 264/54, 111, 273, 278; 416/97 A, 97 R, 96 A, 96 R

[56] References Cited

U.S. PATENT DOCUMENTS

| | | | |
|---|---|---|---|
| 2,843,354 | 7/1958 | Smith | 29/156.8 H |
| 4,090,810 | 5/1978 | Dakin et al. | 416/96 R |
| 4,119,390 | 10/1978 | Dakin | 416/96 R |
| 4,137,619 | 2/1979 | Beltran et al. | 29/156.8 H |
| 4,142,831 | 3/1979 | Dakin et al. | 416/96 A |
| 4,183,456 | 1/1980 | Schilling et al. | 29/156.8 H |
| 4,210,269 | 7/1980 | Schilling et al. | 29/156.8 B |

FOREIGN PATENT DOCUMENTS

| | | | |
|---|---|---|---|
| 651830 | 4/1951 | United Kingdom | 416/96 A |
| 728834 | 4/1955 | United Kingdom | 416/96 A |

OTHER PUBLICATIONS

Grigull et al., Progress in Heat and Mass Transfer, vol. 1, Pergamon Press, 1969, pp. 331-370.

Primary Examiner—James Poer
Attorney, Agent, or Firm—J. C. Squillaro

[57] ABSTRACT

A method of creating a controlled interior surface configuration of passages within a substrate, particularly cooling passages of nozzles or buckets of a gas turbine, involves the hot isostatic pressing of a leachable passage insert whose surface carries the female image of the desired interior surface configuration inside the substrate followed by leaching of the insert from the substrate.

11 Claims, 6 Drawing Figures

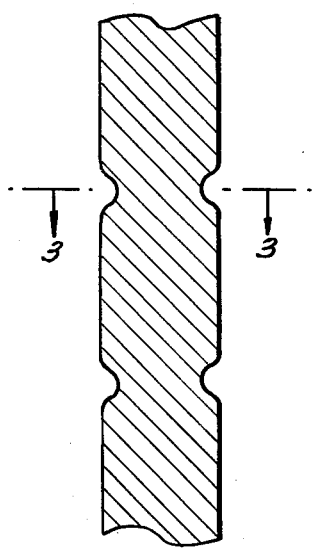
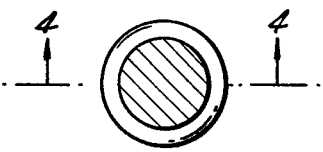
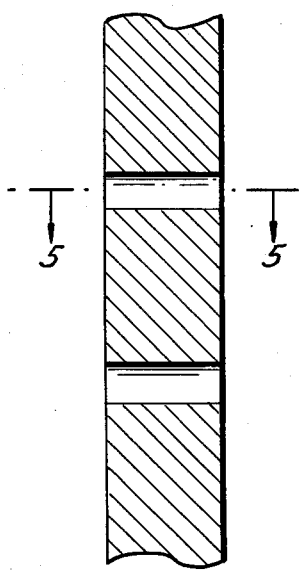
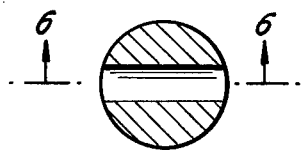

METHOD OF CREATING A CONTROLLED INTERIOR SURFACE CONFIGURATION OF PASSAGES WITHIN A SUBSTRATE

The invention disclosed herein was made in the course of, or under, a contract with the U.S. Department of Energy.

BACKGROUND OF THE INVENTION

Structural arrangements for the opened circuit liquid cooling of gas turbine buckets are shown in Kydd U.S. Pat. Nos. 3,445,481 and 3,446,482. The former patent discloses a bucket having cooling passages open at both end which are defined by a series of ribs forming part of the core of the bucket and a sheet metal skin covering the core and welded to the ribs. The latter patent teaches squirting liquid under pressure into hollow forged or cast gas turbine buckets. A further Kydd patent, U.S. Pat. No. 3,619,076 describes a system where a turbine blade construction involves a central air foil shaped spar which is clad with a sheet of metal having very high thermal conductivity and grooves recessed in the sheet face adjacent to the spar, which grooves together with the smooth surface of the spar define coolant passages distributed over the surface of the turbine blade. Bonding a sheet to a core in such configurations involve numerous disadvantages. When a braze is used to bond the skin, some channels of the turbine buckets become plugged and obstructed with the braze material. Further, excellent bonds are required between the core and skin to contain the water in full channel flow under the extremely high hydraulic pressures which result from the centrifugal forces during operation of the turbine. Any cracks in the skin can cause leakage of the coolant and result in vane failure.

Many of the disadvantages of such prior art are overcome by the invention disclosed in Anderson U.S. Pat. No. 4,156,582 in which water cooling channels are formed using preformed tubes located beneath an outer protective layer composed of an inner skin to provide a high thermal conductivity and an outer skin to provide protection from hot corrosion.

Schilling, et al U.S. Pat. Nos. 3,928,901 and 3,952,939 disclose methods of attaching a sheet cladding to a convex-concave substrate such as an air foil or a turbine bucket using hot isostatic pressing techniques. These procedures, however, when applied to the manufacture of turbine buckets incorporating preformed tubes will tend to collapse the tubes. Additionally, when molten glass is used as the pressure transmitting medium as disclosed in the U.S. Pat. No. 3,952,939 patent, the molten glass can enter the tubes and is difficult or almost impossible to remove without damage to those tubes. To overcome such problems Schilling et al in U.S. Pat. No. 4,183,456 extend the ends of the tubing above the molten glass so that the pressure inside and outside the tubing is maintained at equilibrium to prevent tube collapse during the application of the hot isostatic pressure.

It is desirable to cause turbulence of the cooling fluid as it traverses the cooling passages in cast or wrought gas turbine nozzles or buckets. Such turbulence increases the heat flux passing from the hotter gas path surfaces to the cooler internal fluid which is being used to remove the heat. At the same time, it is desirable to eliminate surface roughness of the cooling passages in order to improve the fatigue life of substrate containing the cooling passages.

A review of the theory and techniques to increase heat transfer can be found in an article by Arthur E. Bergles entitled "Survey and Evaluation of Techniques to Augment Convection Heat and Mass Transfer" which begins at page 331 in volume 1 of *Progress in Heat and Mass Transfer*, edited by U. Grigull and E. Hahne (Pergamon Press, 1969). As pointed out therein, surface promoters including surfaces obtained by machining or protuberances of the insert variety such as wire coils inserted inside tubes are known. Turbine blades having longitudinally extending internal passages for the flow of cooling fluids are shown in British Pat. Nos. 651,830 and 728,834. In the former patent, a finned insert formed separately from the blade is placed in the passage with the fins in good heat conducting relationship with the wall of the passage and in the latter patent, the fin pitch is varied along at least a part of the length of the passageway and the rod insert itself may be removed leaving a fin with a hollow core. A configuration in which a plurality of elements are positioned within the passageways extending traversely with respect thereto and being apertured to permit flow of fluid is shown in U.S. Pat. No. 2,843,354.

Liquid cooled buckets in which cooling passages which are cylindrical in configuration are described in U.S. Pat. Nos. 4,098,010, 4,119,390 and 4,142,831. In the first named patent, cylindrically shaped coolant passages for liquid cooled turbine buckets are converted into at least two helical subpassageways by flow splitting means introduced into individual coolant passages and fixed in place as by brazing or tight mechanical fit. In addition, each flow splitting or flow modifying means is provided with means disposed therealong for interupting the liquid flow in each helical subpassageway. The second patent describes a plurality of oriented spanning elements which are affixed in and extend across each cooling passage. The last named patent, U.S. Pat. No. 4,142,831, provides each of the individual coolant passageways in the airfoil portion of a liquid cooled turbine bucket with a plurality of circumferentially extending crimps or protrusions, located at spaced intervals along each coolant passage, each protrusion extending along the inner periphery of the coolant passage over ancuate length of at least about 120° being disposed in a plane generally perpendicular to the wall of the coolant passage at that location. The flow of liquid coolant moving in each of such coolant passages during the operation of the turbine under the influence of centrifugal forces is broken up and dispersed upon encountering the protrusions thereby contacting a larger area of the interior of the coolant passage.

It is the object of this invention to provide a new technique for creating cooling passages within a substrate, particularly a drilled or cast gas turbine nozzle or bucket which will simultaneously promote turbulence of the cooling fluid flowing therethrough while improving fatigue life by minimizing surface roughness and susceptability to inner granular attack. This and other objects of the invention will become apparent to those skilled in this art from the following detailed description in which FIG. 1 is a cross-section of a typical monolithic gas turbine nozzle containing cooling passages according to the present invention;

FIG. 3 is an end view of a reduced diameter turbulance promoter;

FIG. 4 is a section along 4—4 of FIG. 3;

FIG. 5 is an end view of a midchord turbulance promoter; and

FIG. 6 is a section along 6—6 of FIG. 5.

SUMMARY OF THE INVENTION

This invention relates to the fabrication of a controlled interior surface configuration of passages within a substrate and more particularly to a method of creating turbulence promoters and a controlled surface finish in drilled or cast cooling passages of nozzles and buckets by hot isostatic pressing of a leachable passage insert carrying a female image of the desired passage surface configuration followed by leaching the insert from the substrate.

DESCRIPTION OF THE INVENTION

Figure 1:
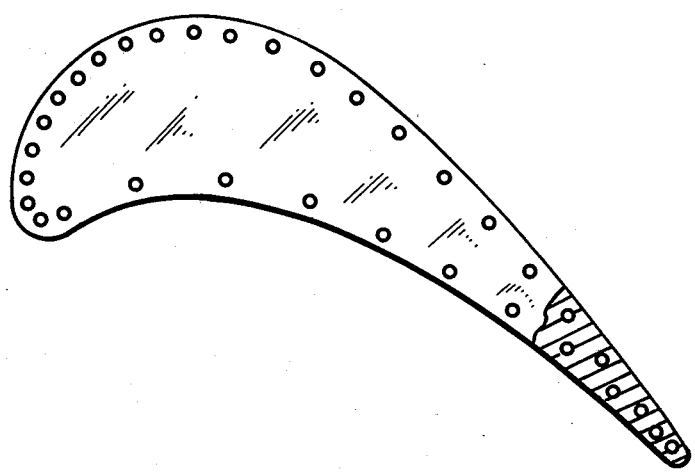
Figure 2:
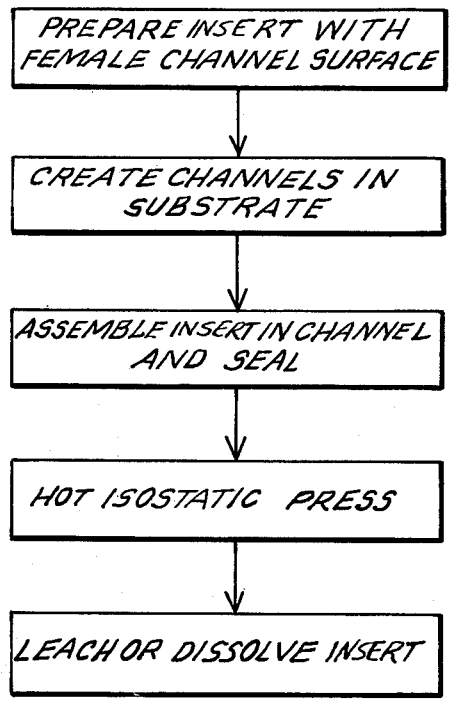
FIG. 2 is a flow sheet of the new process.

FIG. 1 shows a cross-section of a typical monolithic gas turbine nozzle which can be prepared according to the method of the present invention. It will be noted that the plurality of cooling passages which traverse the nozzle can be seen in this nozzle section. The passages can have a surface configuration designed to improve heat transfer. Two typical configurations are shown in FIGS. 3-6. An end view of a reduced diameter turbulence promotor and a section thereof is shown in FIGS. 3 and 4, respectively. Similar end and section views of a midchord turbulence promoter are seen in FIGS. 5 and 6, respectively. Other configurations can be used as desired.

The monolithic nozzle of FIG. 1 and other gas turbine assemblies are prepared in accordance with the present invention by preparing a suitable insert whose surface carries the female image of the desired passage surface configuration. The insert material is selected to withstand the pressures generated during the hot isostatic pressing without any significant deformation and to be dissolved or leached by an agent which does not detrementally attack the material in which the cooling passages are formed. Mild steel has been found to be appropriate. Various other materials can be utilized as the material of construction of the inserts such as, for example, ceramic silicates or carbon. The surface of the inserts can be shaped by any appropriate means such as being notched, drilled or otherwise formed to the desired female image. Also, as shown below, the insert can carry non-leachable elements to be bonded or fused to the passageway walls.

The area within which the cooling passages are to be formed is of a solid material or powdered metal. Typical examples include copper and high temperature alloys. These high temperature alloys are generally nickel, iron, or colbalt base alloys. The more complex high temperature alloys contain a number of elements and are typified by IN-718 which contains 19 wt.% chromium, 19+ wt.% iron, 5 wt.% columbium and tantalum, 3 wt.% molybdenum, 0.9 wt.% titanium, 0.4 wt.% aluminum, 0.04 wt.% carbon and the balance being nickel. Other high temperature alloys include Hastelloy-X, FeCrAlY(2541), HS-188, 304 stainless steel and the like, all of which are commercially available. The desired passageways are drilled or otherwise formed in the wrought, cast or consolidatable powder metal substrate in such a manner as to permit insertion of the insert leaving a gap between the insert and the substrate as small as feasible.

The passageway surfaces of the substrate and insert surface may, if desired, be prepared by appropriate means such as chemical etching, degreasing, abrading or nickel plating and the insert is then placed into its proper position within those passageways. The seams or interfaces between the insert and the substrate are further prepared by masking to prevent penetration by the pressure transmitting medium into the interface between the insert and the substrate. For example, masking may be carried out by tack or spot welding a thin sheet material carrier (e.g., a thin metal sheet), brazing, or a combination thereof. A localized or general application of a suitable sealant such as a silicate glass frit can also be applied to the seams or interfaces in order to ensure that a complete or tight seal is achieved. In general, some type of sealing step is required to keep the pressure transmitting medium, whether it is in the solid, gaseous or molten state, from entering the mold-substrate interface.

The assembly is then subject to hot isostatic pressing (HIP) at elevated temperature and pressure which causes the substrate to move into intimate contact with the insert and assume the negative configuration of the insert surface. The sealing agent is viscous during this step of the process and can easily accommodate any movement while maintaining the required differential across the insert-substrate interface. After the hot isostatic press cycle is complete, any remaining amount of sealing agent can be easily removed by such means as sand blasting or the like.

As a final step in the method of the present invention, the insert is eliminated from the assembly by the use of a suitable leachant or dissolving chemical which varies depending on the material of construction for the insert. When mild steel inserts are used, nitric acid is a suitable leachant chemical. Of course, other leachants can be employed as appropriate such as, for example, the use of air at high temperature in order to oxidize and thereby remove inserts made of carbon. The leaching or dissolving procedure removes the insert material resulting in the desired surface appearance configuration in the cooling passageway.

In order to further illustrate the present invention, an example of the formation of a turbine bucket having cooling passages is described below. It will be appreciated that throughout this specification and claims, all parts and percentages are given by weight unless otherwise specified.

A wrought IN-718 bucket is obtained in the as forged condition and a series of holes are machined through the interior thereof. After machining, the bucket and holes are cleaned. A series of mild steel rods are machined to form the female image of the desired turbulance promoter to be formed in the cooling passage of the bucket. Some of the insert rods are drilled through their diameters with through holes and small pins made of the same superalloy as the bucket, that is, IN-718, are inserted into these holes. The pins are positioned so that their ends are coextensive with the surface of insert rods. The machined mild steel rods are inserted in the drilled cooling holes in the bucket. The ends of the passageways are sealed to support a pressure differential during the subsequent hot isostatic pressing by tack welding a stainless steel foil over the ends followed by the local application of a glass frit to form a pressure seal during the hot isostatic pressing operation. After the HIP operation, the stainless steel foil is mechanically removed and the part is exposed to a nitric acid solution until the mild steel rods have been removed. As a result, the tubulence promoter configurations and the desired surface finish appear in the coolant passageways. In this manner, the coolant passages in the bucket are configured by using a leachable core material around which solid material is caused to plastically flow during the hot isostatic pressing cycle and/or which carries a suitable shaped configuration of substrate material for bonding to walls of the passageway.

Various changes and modifications can be made in the method of the present invention without departing from the spirit and scope thereof. The various embodiments which have been disclosed herein were for the purpose of further illustrating the invention but were not intended to limit it.

We claim:

1. A method of creating a controlled surface configuration of passages within a substrate which comprises assembling said substrate and a leachable passage insert whose surface carries a female image of a desired passage surface configuration, hot isostatic pressing said substrate against said insert, and leaching said insert from said substrate to create the desired passage surface configuration in said substrate.

2. The method of claim 1 wherein said passage insert is inserted in said passage.

3. The method of claim 2 wherein a seam formed between the insert and the substrate is sealed prior to hot isostatic pressing.

4. The method of claim 3 wherein said insert is a mild steel rod.

5. The method of claim 4 wherein said mild steel rod is leached by nitric acid.

6. The method of claim 5 wherein glass is used as a pressure transmitting medium during said hot isostatic pressing.

7. The method of claim 1 or 4 including the step of forming a negative image of the desired passage surface configuration on the exterior surface of said insert.

8. The method of claim 7 wherein said negative image is the negative of a surface configuration adapted to cause turbulence of fluid flowing within said passage.

9. The method of claim 1 wherein a plurality of said inserts are so assembled, pressed and leached simultaneously.

10. The method of claim 1 wherein said substrate comprises a powder which is consolidated at the same time as the hot isostatic pressing of said substrate against said insert.

11. The method of claim 1 wherein said insert carries non-leachable elements adapted to be bonded to said substrate within said passages as a consequence of said hot isostatic pressing.

* * * * *